US012673334B2

(12) United States Patent
Hardman

(10) Patent No.: US 12,673,334 B2
(45) Date of Patent: Jul. 7, 2026

(54) HYDRAULIC PUMP PROVIDING ENHANCED PHYSICAL MOBILITY

(71) Applicant: Richard Hardman, Bayfield, CO (US)

(72) Inventor: Richard Hardman, Bayfield, CO (US)

( * ) Notice: Subject to any disclaimer, the term of this patent is extended or adjusted under 35 U.S.C. 154(b) by 0 days.

(21) Appl. No.: 18/418,975

(22) Filed: Jan. 22, 2024

(65) Prior Publication Data

US 2025/0237212 A1 Jul. 24, 2025

(51) Int. Cl.
*B05B 7/24* (2006.01)
*F04B 15/02* (2006.01)
*F04B 9/109* (2006.01)

(52) U.S. Cl.
CPC ............ *B05B 7/2464* (2013.01); *F04B 15/02* (2013.01); *B05B 7/2491* (2013.01); *F04B 9/109* (2013.01)

(58) Field of Classification Search
CPC ........ F04B 9/109; F04B 15/02; B05B 7/2491; B05B 7/2416; B05B 7/2464; E04F 21/02–1657
See application file for complete search history.

(56) References Cited

U.S. PATENT DOCUMENTS 2,820,672 A * 1/1958 Arce ........................ E04F 21/12 239/371
2,942,860 A * 6/1960 Ridley .................... E04F 21/12 366/11
3,011,444 A * 12/1961 Hobson ................... E04F 21/12 417/339
3,015,529 A 1/1962 Hardcastle
3,033,123 A * 5/1962 Kinzelman ............. F04B 9/113 417/264
3,622,130 A * 11/1971 Malm ..................... E04F 21/12 366/4
4,541,779 A 9/1985 Birdwell
4,962,819 A 10/1990 Bailey, Jr.
5,228,842 A 7/1993 Guebeli
5,497,812 A 3/1996 Orosco
5,535,926 A 7/1996 Blitz
5,647,737 A 7/1997 Gardner et al.
5,740,718 A 4/1998 Rathweg
5,878,925 A 3/1999 Denkins et al.
6,820,648 B2 11/2004 Castagnetta, Jr.
(Continued)

*Primary Examiner* — Thomas Fink
(74) *Attorney, Agent, or Firm* — Michael L. Greenberg, Esq.; Greenberg & Lieberman, LLC

(57) ABSTRACT

A piston-driven pump apparatus configured to transfer liquid-based abrasive materials via a pressurized hydraulic medium which is capable of physical manipulation between remote material reservoirs. The apparatus exhibits a remotely tethered double-acting pump having independence from a fluidic supply source. The pump is configured to be removed from a first material reservoir and placed in communication with a second material reservoir by physical manipulation. The apparatus has a cylindrical sleeve assembly which has a wearing sleeve which may be removed and/or rotated to increase the operational time of the apparatus before an end-of-life replacement of the sleeve is required. The apparatus diminishes a pulsation effect of conventional double-acting piston pumps via a compressible pressure sleeve which is capable of deformation within a pump housing. A metering device is present to control the external flow of abrasive material, providing back pressure against an internal compressible sleeve.

8 Claims, 8 Drawing Sheets

(56) References Cited

U.S. PATENT DOCUMENTS

| | | | |
|---|---|---|---|
| 7,621,309 | B1 | 11/2009 | Mondloch et al. |
| 7,886,943 | B1 | 2/2011 | Denkins et al. |
| 2004/0182042 | A1 * | 9/2004 | vonBampus .......... B05B 7/1495 52/742.13 |
| 2008/0011877 | A1 * | 1/2008 | Hibbard ................ B05B 7/2489 239/146 |
| 2009/0266295 | A1 * | 10/2009 | Saunders .............. B05B 9/0838 118/300 |
| 2010/0139928 | A1 | 6/2010 | Riley |
| 2019/0242142 | A1 * | 8/2019 | Kuhn ...................... E04F 21/20 |

* cited by examiner

Fig. 5
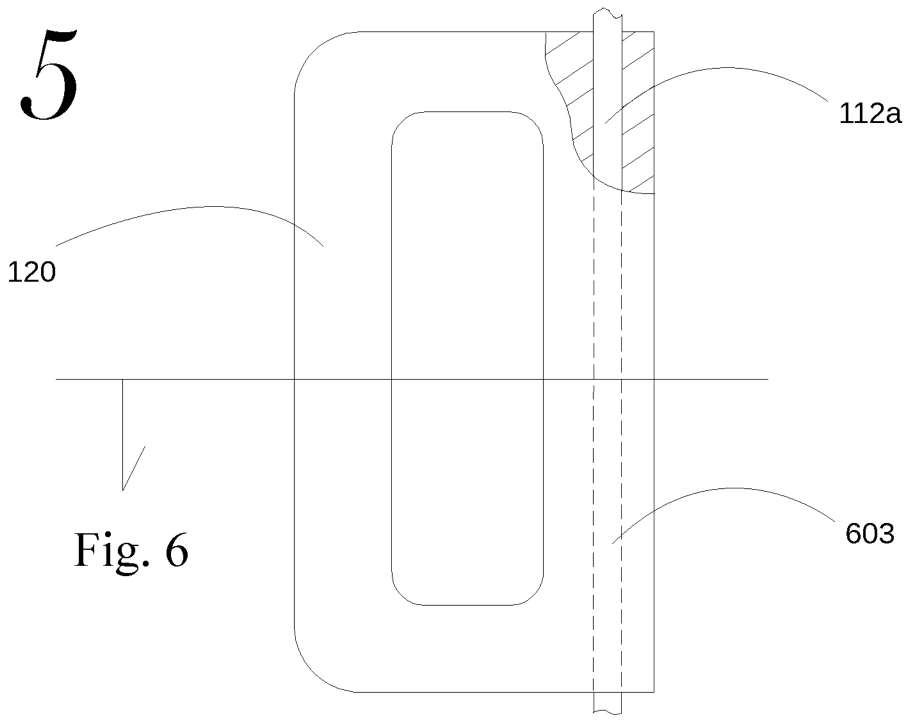
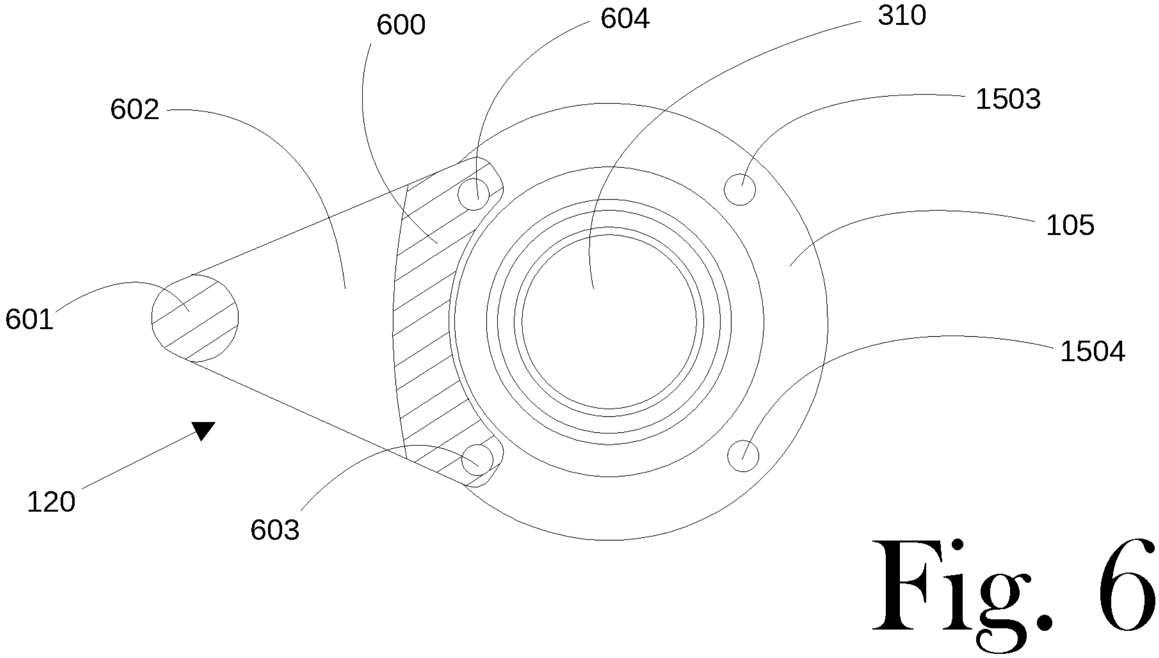
Fig. 6

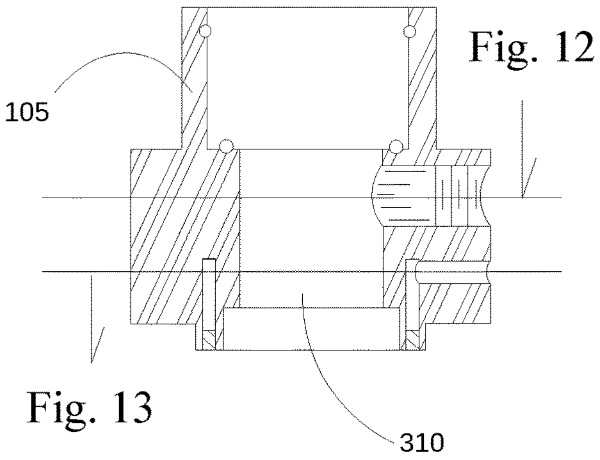
Fig. 11
Fig. 12
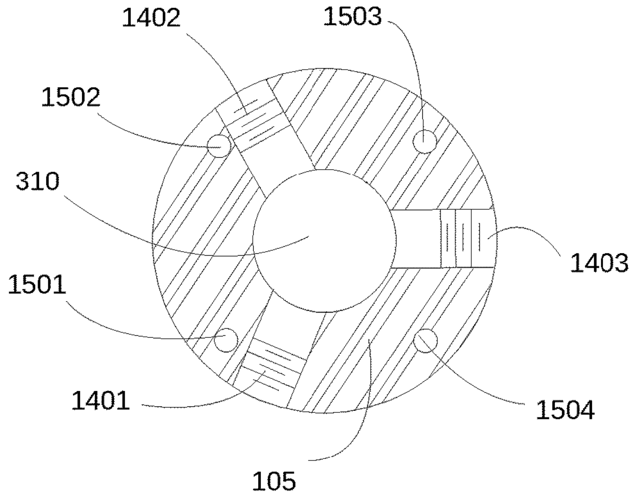
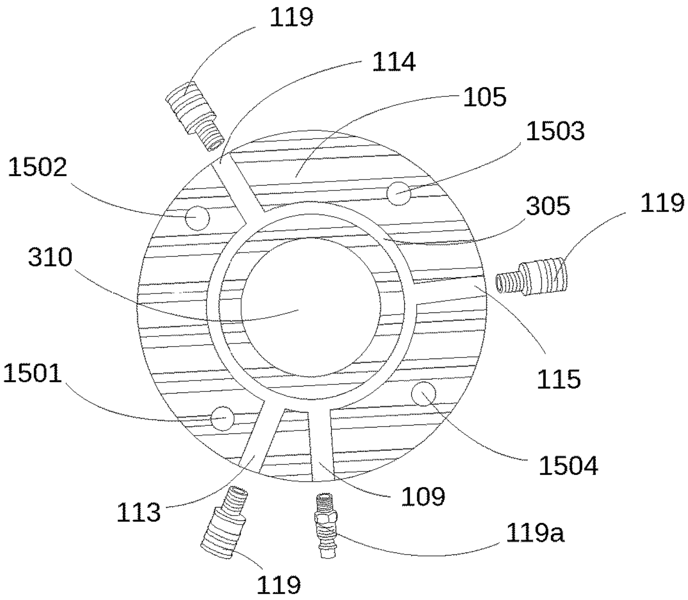
Fig. 13

HYDRAULIC PUMP PROVIDING ENHANCED PHYSICAL MOBILITY

FIELD OF THE INVENTION

The present invention relates generally to the increased mobility of a high-pressure piston pump and more particularly to a hydraulically supplied piston pump having a replaceable pump motor being capable of transferring abrasive materials and an improved method of practice.

BACKGROUND OF THE INVENTION

Drywall installation can be provided in a variety of ways depending upon the type of structure, the size of the structure and the distance between multiple structures that may exist on a given project. Most commonly drywall panels are affixed to the interior stud surfaces of the wall and ceiling areas within a building. The adjoining panels result in joints located between the various pieces of drywall. These joints are covered with a non-adhesive backed paper tape. The paper tape is adhered to the drywall surface with a thin layer of drywall compound that is applied wet between the paper tape and the drywall panel surface. The tape adheres to the drywall panel surface during the drying process. After the tape dries one or more smoothing coats of additional drywall compound are applied in a manner to provide a smooth layer of drywall compound over the tape so as to blend the surface of the newly applied compound onto the surrounding drywall panel surface. After smoothed, the drywall surface is often textured with an independent texturing machine and then painted.

Attempts have been made to provide various application tools for use in the drywall industry which are connected to a remote pump system by way of a hose that delivers a continuous flow of drywall compound from a remote material reservoir to the point of application. This technology is known in the field as a Continuous Flow System (CFS). The CFS tools such as the Apla-Tech Inc. CFS Taper (U.S. Pat. No. 7,621,309B1 FIG. 1) operate with some success but suffer from an ineffective method of supplying drywall compound to their application tools (see Apla-Tech Inc. pump U.S. Pat. No. 5,878,925A FIG. 1 and FIG. 2 and Apla-Tech Inc. U.S. Pat. No. 7,886,943B1 FIG. 1). Pumping drywall compound is sometimes accomplished through what is known as a vertically operated piston pump.

While there are many configurations in the art which are used within this description, the present invention improves upon a double acting vertical apparatus which includes a pump motor and a multiplicity of internal components which function as follows; a first check valve mounted at the lowest most end of a cylindrical sleeve of the pumping unit allows liquid abrasive material to flow through said first check valve and into a lower cavity within said cylindrical sleeve which is created during the upward cycle of the pump motor from a material reservoir positioned external of the pumping apparatus. During said upward cycle of the pump motor, once the pump has been primed with liquid abrasive material, the upper portion of the pump apparatus contains remaining liquid abrasive material which is separated above and apart from the liquid abrasive material that is drawn into the lower cavity within the cylindrical sleeve above the first check valve by a second check valve assembly. During said upward stroke of the pump motor, this remaining liquid abrasive material is pushed upward through the pump and outward of the exiting port. The second check valve assembly is in mechanical communication with the pump motor extending shaft. The pump motor extending shaft is the element of the pump motor which is contained both internally and externally of the pump motor housing that moves in a linear fashion in an extending and contracting manner.

During the down stroke of the pump motor the liquid abrasive material that was provided into the cavity immediately adjacent to the lower first check valve by a previous upward stroke of the pump motor is dispensed upwardly through the second check valve with a portion of the liquid abrasive material proceeding outward through the discharge port. As a result, liquid abrasive material is transferred through the exiting port of the pumping apparatus during the upward and downward strokes of the pump motor. Paint systems of the art provide additional discharge ports which are located separate from the actual pumping unit through an external material manifold which is in mechanical communication with the exiting port of its pumping cylinder. A double acting piston pump of the type described above discharges liquid abrasive material during the upward and downward cycle of its pump motor and is well suited for thicker viscosity liquids when the pump motor is furnished with pressurized hydraulic fluid. In the art, double acting pumps utilizing hydraulic fluid to drive a pump motor are often rigidly affixed to a mechanical framework by way of its pump structure which eliminates the ability of an operating technician to lift and manipulate the pump independently of its frame structure.

Other hydraulically provided piston pumps are rigidly mounted to a location separate from the material reservoir having flexible tubular communication between the material reservoir and its first check valve. One example of a remote mounted vertical piston pump of this type is the Graco Hydraulic Dyna-Star 1:1 Oil Dispensing Pump. In Graco's instructional booklet, Dyna-Star™ Hydraulic Reciprocator and Pump #: 308155V, on page 6 an illustration is provided designating the remote mounting configuration of the pumping system for achieving the pumps maximum potential for transferring lubricating fluids. It is specifically mentioned that this pump is to be used only with lubricating fluids. It is not designed for the transference of abrasive materials. Graco's Vehicle Service Equipment Buyer's Guide provides additional information on the Dyna-Star pump on page 80 and 81.

Desco Manufacturing utilizes a double-acting hydraulically-powered pump motor to supply drywall material while rigidly mounted to a piping system which transfers the drywall material from a fixed mixing tank through a hose to a spray attachment located some distance from the mixing location. By way of its piping system, the Desco hydraulic pump is rigidly affixed to a trailer for transporting the mixing apparatus to various job sites. Other spray systems such as those provided by the Graco, or Titan companies require the lower-most extension of their hydraulically-powered double-acting piston pump to be submerged directly into a 5-gallon reservoir where liquid abrasive materials are removed from the 5-gallon reservoir and transferred through a hose. The Graco and Titan hydraulic double-acting pumps are likewise mechanically affixed to a rigid framework which features wheels, enabling the apparatus to be relocated on a job site or loaded into a vehicle for transport. To relocate the piston pump from an empty material reservoir to an accompanying full material reservoir, the entire framework of the Graco and Titan pumping systems, including their piston pump, is required to be tilted upward and away from the existing reservoir and then lowered into a second reservoir of material which limits the upper edge measurement of a usable material reservoir to the distance from the floor of the working area to the bottom of the pump frame immediately adjacent to the pump unit. This type of apparatus is typically limited to using a 5-gallon reservoir as a material reservoir.

In an application where material is required in a high-capacity effort such as simultaneously supplying drywall material to a variety of drywall material applicators, it is common that volumes of 3 gallons of drywall material are used in a 60 second period. Thus, it is imperative that a more efficient pumping method be used to draw drywall material from higher capacity material reservoirs. Manufacturers have determined that the best way to improve profits it to use a minimal number of frame mounted pump designs in conjunction with as many field applications as possible. This results in awkward and potentially dangerous machines that are also cost prohibitive to the smaller contractors in the market. Examples of this approach to market can be reviewed in the attached document provided with this application, 344409EN-A Graco Big Rig Technical Information; page numbers are referenced.

Typical of these configurations are the GH 1017 Big Rig Hydraulic Series (pages 9, 12, 15, 18) the GH 2570ES Big Rig Gas Hydraulic Series (pages 9, 11) the GH 833 Gas Hydraulic Series (pages 6, 11,) and the GH 733ES Gas Hydraulic Sprayer Big 250 System (pages 9, 11) having mounted pumping systems being secured by way of their pump structure can be seen mounted to a variety of wheel straddling frames. Being rigidly configured, there is no method by which the operating technician can submerge the lower-most end of the pumping section into a larger material reservoir.

Graco has developed methods by which their engineers have tried to accomplish this task. As seen in the Graco information above and specifically noting the GH 733 Gas Hydraulic Series (pages 9, 11, 17) a hose is attached to the lower end of the hydraulic powered pump whereby its opposite end is then submerged into an independent material reservoir. Using a hose to draw heavy viscosity materials such as gypsum or cement-based slurries through the empty hose from a remote reservoir causes the internal pump seals to be cycled dry for a period of time without the lubrication which is supplied by the influx of liquid abrasive material. Consequently, the continued period of time during which no liquid material is supplied to the seals causes the seal material to deteriorate in a more rapid manner than if lubricated.

In a second attempt to pump liquid abrasive material from a higher capacity reservoir, Graco offers another apparatus whereby they attach a mechanical sleeve to the bottom of a standard pump assembly. Featured in the accompanying Graco Fast Flo Air Powered Pump-Extension Tube Document #307459b the manufacturer illustrates the ability to couple a lower section of cylindrical tube having an extended length of measurement. By providing an extended cylindrical tube, the lower-most end of the unit can be positioned within a taller material reservoir. An obvious shortcoming is presented as the longer the distance is between the lower first check valve of the Graco pump and the lower-most end of the extended cylindrical tube, the more dramatic are the negative effects upon the internal piston seals during the pumps priming phase of operation. During the period of time when the seals are dry cycling without fluid to lubricate the interior wall of the cylindrical sleeve assembly, undue friction creates heat which deteriorates the internal seals at a much faster rate than is necessary. Graco has created another apparatus consisting of an additional framework that is attached to a pump assembly which is tilted out and away from one large material reservoir and inserted into another. This higher mounted pivoting assembly can be especially dangerous if the apparatus were inadvertently tipped over on a jobsite, or by an operating technician trying to move the pump assembly from one location to another whereby the high center of gravity involved with this design could cause the unit to become unstable or otherwise difficult to manipulate. This pump pivoting assembly is known as a Direct Immersion Kit 55-gal Part Number: 287843 and may be seen on page 15 in the attached document provided with this application, 344409EN-A GRACO BIG RIG Technical Information.

The Titan company has also designed a method to dispense liquid materials from a larger reservoir. In addressing this Titan design, as with Graco, Titan utilizes a pump structure which is common to other Titan mounting frames and applications. The Titan Hydra M4000 w/ 55 Gallon Remote 433-802 system incorporates a tethered pump motor cyclically manipulated by the internal use of various hydraulic channels, actions, and fluidic manipulations acting within the pump motor and may be viewed in greater detail in the accompanying document, Form No. 0528925L Speeflo Hydra M™/Hydra Pro Super™ Gas Powered Airless Sprayer drawing two on the lower half of page 16, and on page 18 also being the lower drawing toward the bottom of the page. Numeral references to model number Hydra M 4000 433-802 can be seen on pages 1 and 19 of the same document.

It should be noted that the pumping unit contained within the Hydra M4000 w/55 Gallon Remote 433-802 system is the same pump unit provided with several wheeled frame structures throughout the document. The Titan Hydra M4000 w/55 Gallon Remote 433-802 utilizes various frame elements which support a plurality of conduits that are mounted to the upper vertical edges of a material reservoir. The Titan Hydra M4000 w/55 Gallon Remote 433-802 pump motor is extremely top heavy as it was originally designed to be mounted to a support frame with wheels and accompanying structural elements. As seen in the accompanying documentation the Titan Hydra M4000 w/55 Gallon Remote 433-802 is supported upon the frame structure with external rods affixed independently and upwardly to the pump motor and at its lower most end to a standard pumping mechanism that is common to other Titan painting systems. An obvious disadvantage in the design of the Titan Hydra M4000 w/55 Gallon Remote 433-802 pump system is a second pipe Titan connects to the export fitting of its pumping mechanism which upon utilizing a threaded fitting to mate with the lower pumping mechanism makes a 90-degree turn projecting upward toward the top of the material reservoir meeting with the support frame, extending upward beyond the supporting frame, and making a second 90-degree turn whereby a hose is connected, servicing various sundries being furnished with liquid material at a distanced working area. Having a second pipe being mounted to the submerged pumping mechanism beneath the surface level of material and parallel to the pump unit creates a vulnerable structure which is insufficient in its mechanical construction and is susceptible to bending or being otherwise damaged as the apparatus is manipulated during operation, moved around a jobsite, or loaded into a transporting vehicle to be reused at another location. An additional weakness in the design is the aforementioned weight of the pump motor structure. If the pump were to be operated without its frame arrangement, the high center of gravity makes the material reservoir susceptible to tipping over as the weight of the material within the material reservoir is emptied from the material reservoir during the pumping process. The less pressure applied to the bottom surface of the material reservoir by weight of the material volume within the reservoir reduces the stability of the entire pump motor and material reservoir assemblage.

Likewise, with all of the Graco and Titan products specified, the cleaning and maintaining of their pumps systems are much more labor intensive and time consuming than is necessary. Inherent to all double acting pump systems of the art, each invention is dependent upon a proprietary pump motor which operates in functional compliance with other sole source components found within the pump head structure of its unique design. During research no single acting or double acting pump of this type has been found that is specifically constructed to allow for the easy removal of the pump motor and for its replacement with a standard pump motor cartridge after its operational life has ended.

In contrast to the aforementioned prior art, in the present invention, a standard pump motor cartridge employs merely a double-acting hydraulic cylinder having all methods of mounting to another apparatus removed. To transfer viscous slurry type fluids, which contain abrasive elements such as sand-ladened Cementous materials or gypsum-based compounds, a piston pump is required to incorporate a stronger wearing substrate to bear the back-and-forth frictional involvement between the seals located on the circumferential edge of the check valve seal assembly affixed to the pump motor extending shaft and the inner surface of its cylindrical sleeve. 440 stainless steel can be utilized in this application. 440 stainless steel is durable and machinable. It can be heat treated to provide an even harder wearing surface. Even though the Graco and Titan companies often claim that their pumps have the ability to spray drywall material in a texturing application, the operating technician is required to incorporate the use of a completely independent compressor hose system to provide enough air to apply the heavier spray patterns and in the volume needed to be used on high production construction projects. The previously cited Desco spray trailers (also see Desco Trailer Mounted Spray Systems in the provided Desco documentation) have an independent on-board compressor which supplies air through a hose to the eventual point of spray application without having any physical involvement with the material pump. Desco, as with Graco, Titan and other companies do not provide a material pump capable of supplying air to a variety of application tools by way of its fundamental pumping structure, unlike the present invention.

Another inefficiency in double-acting piston pumps is encountered when the pump motor reaches the top and bottom of each stroke cycle at which point the ball contained within the second check valve assembly, affixed to the pump motor extending shaft and the ball residing in the lower first check valve, changes direction. During the period of time required for the valve balls to change direction, the external flow of liquid abrasive material is discontinued until the pump motor begins moving in the opposite direction and each check valve ball has re-seated. At this moment of pause a delay is encountered in the external flow of liquid abrasive material which is detrimental to many application processes including spraying drywall or cement texture applications. As a result of this delay the technician is forced to reapply areas of the application that are not covered with a uniform volume of liquid abrasive material during the first attempt at application. The act of pausing the liquid abrasive material flow coinciding with the period of time between the changing stroke directions of the pump motor, and the re-seating of the ball valves, is a phenomenon known as pulsation. In texturing practice, the portion of a surface area which is not covered entirely in the first pass of application is referred to as a holiday. There are accessories that can be attached externally to a double acting piston pump which help to provide a neutralizing effect to the delay in flow that takes place during pulsation. Most typically known as a pulsation dampener it may consist of internal springs mounted in conjunction with a sealed piston. Sometimes a gas pressurized bladder is used instead of a mechanical spring which is compressed during the period of time when the dispensing fluid is under pressure. During the period of pulsation, the spring or pressurized bladder expands and expels liquid abrasive material out through the hose thus filling in the period of time when no fluid is being transferred. A pulsation dampener ensures that a continual flow of fluid is provided during the entire 360-degree cycle of the pump motor. The addition of a separate apparatus to compensate for the pulsation effect is inherently inefficient as it adds significantly to the weight and cost of the pump system and introduces an increased number of components which may eventually need to be replaced. Double acting piston pumps such as the Desco hydraulically driven material pump includes a wearing sleeve (see Desco Manufacturing Vertical Pump Drawing Wearing Sleeve Item 19 in the provided Desco documentation) which is indicative of other pumps having wearing sleeves provided in a length generally synonymous with the length of the linear stroke of their pump motor extending shaft. Since the wearing sleeve is the same general length as the stroke of the pump motor extending shaft, the operating technician must purchase a new wearing sleeve when the existing wearing sleeve is worn beyond its ability to form a seal with the mounted circumferential seals which are assembled to the second check valve assembly and is affixed to the pump motor extending shaft. This requires significant down time to service the unit.

In general, vertically operated double acting pumps of the art which are most relevant to the present invention utilize high pressure hydraulic fluid to operate the cycling effect of a pump motor and are typically found in a configuration which includes a pump motor being in structural communication with a pumping sleeve assembly rigidly mounted into a frame figure or independently mounted to a foreign structure apart from a material reservoir. The sole sourced pump motor generally consists of a single cylinder sleeve mounted between two sealed housing blocks which contain internal valving and an extending rod which is cycled and internally located within the cylinder sleeve. These pump systems are complicated to service and often require the pump assembly to be removed from its structure and returned to a factory authorized service center for replacing the hydraulic seals extending rod, and other miscellaneous components. Spray insulation pumping systems are commonly removed from one large material reservoir to another material reservoir and incorporate a pneumatically powered pump motor which contains an internal spring rebounding mechanism which allows the piston of the pneumatic pump motor to operate in rapid succession throughout its 360-degree cycle. However, the nature of pneumatics allows for the compression and expansion of compressed air during the pumping process which proves extremely inefficient and fallible when attempting to pump higher viscosity materials. Another disadvantage of the pneumatically powered spray insulation pump is that since the liquid insulation material is of a synthetic and compositionally fluent structure, the air powered pumps use a cylinder sleeve existing of a relatively softer mineral-based alloy which is less expensive to manufacture than what is required for the transference of abrasive slurry type substances. IPM 1;1 spray pumps are typical of this softer cylindrical sleeve technology (see IP01-Stainless-810105-English Operators Manual in the attached IPM documentation IP01-Stainless-810105-English Operators Manual provided with this application) as is the aforementioned Graco Fast Flo Air Powered Pump as described in the provided document #307459b. No independent vertical pump system designed to transfer liquid-based abrasive materials utilizing hydraulic fluid pressure and being free-standing has been found in the art.

Andrew Daile Riley's application US2010/0139928A1 FIG. 2 item 180 illustrates a cylinder sleeve which is placed internal to a larger elastomeric tube 190 which in turn is located within hull portions 132, and 160 (of US2010/0139928) serving as an external housing. The specific method of positioning the sleeve will provide a replacement option but does not allow the original wearing sleeve to be reused, and thus requiring the purchase of a completely new component when no longer serviceable, producing unnecessary additional cost to the user. Also being contained within a larger body structure to enclose the cylinder sleeve adds weight and additional components to the pump which are not necessary.

In U.S. Pat. No. 6,820,648, David J. Castagnetta Jr. created an externally mounted relief valve that works in conjunction with a single acting traditional manual pump used to fill automatic taping and finishing tools in the drywall industry. In its traditional configuration, an over center handle (not shown in U.S. Pat. No. 6,820,648) is attached to the pump structure noted as item 50 in FIG. 2 (in U.S. Pat. No. 6,820,648) and is leveraged in an upward and downward motion, moving a flap seal check valve (not shown in U.S. Pat. No. 6,820,648) within the pump structure 50 mounted to the opposite end of the piston 51 noted in FIG. 2 (shown in U.S. Pat. No. 6,820,648) to drive drywall material from the 5-gallon reservoir upward through the pump structure. As the operator lifts the over center handle in an ascending manner, the internal plunger (not shown in U.S. Pat. No. 6,820,648) containing the now upward bending flap check valve moves downward through the pump sleeve (noted as the pump 50 without differentiating the independent pump sleeve in FIG. 2 (of U.S. Pat. No. 6,820,648) allowing drywall material to pass through the flap seal check valve (not shown in U.S. Pat. No. 6,820,648) filling the pump 50 in FIG. 2 with drywall material. Once arriving at the upper most height of the over center pump handle the operator changes direction of motion and consequently begins the downward stroke of the over center pump handle. During the down stroke of the over center handle the flap seal check valve seals against the valve surface (not shown in U.S. Pat. No. 6,820,648) driving drywall material upward through the pump 50 shown in FIG. 2 (in U.S. Pat. No. 6,820,648) and outward to fill automatic drywall tools. U.S. Pat. No. 6,820,648 simply removes the over center handle and mounts the pump 50 (FIG. 2) to an electric motor and combines a relief valve to monitor the rotation of an electric motor which drives the pumping system (all components illustrated in FIG. 2). As patented, the single acting upward delivery of drywall material by way of the seal check valve may operate as specified, nonetheless, is not as efficient as a hydraulically supplied double acting pump when a continual flow of drywall material is mandatory.

U.S. Pat. No. 5,740,718, invented by Christopher Rather, features a pump which is very well illustrated on Sheet 1 FIG. 1 (of U.S. Pat. No. 5,740,718). Noted on Sheet 2 FIG. 4 and on Sheet 3 FIG. 5 (of U.S. Pat. No. 5,740,718) is a double acting pump typical of most high-pressure paint application sprayers. It features an outer cylinder FIG. 5 item 270 embodying an upper rod 134 and lower rod 136 (U.S. Pat. No. 5,740,718) internally positioned within an upper sleeve 180 (FIG. 5) located prior to a discharge port 274 (FIG. 5). Item 270 in FIG. 5 (of U.S. Pat. No. 5,740,718) provides an interior wearing surface which mates with lower packings 170 (FIG. 5). The design is unduly complicated as the outer cylinder 270 (FIG. 5) requires extensive machining to manufacture and adds more cost to the pump than is required. Another flaw in this technology (U.S. Pat. No. 5,740,718) is that, once operational wear has exceeded acceptable tolerances, the outer cylinder 270 (FIG. 5) needs to be replaced and the owner must purchase a new outer cylinder 270 (FIG. 5) with its high manufacturing costs.

U.S. Pat. No. 5,647,737 features inventors Richard K. Gardner, Roger D. Weiland, and Mark D. Jermeay's approach to a double-acting piston pump which is disadvantaged by using a common cylinder tube 62 (FIG. 2) to function as a wearing surface for the lower piston assembly and simultaneously secured in its upper section to function as a transfer tube for liquids traveling through the pump toward its discharge port 44 (FIG. 2). In claim 3 the application specifies "a tube wall" stating that the invention contains a single cylindrical unit to provide the transfer of material through its structure. When it is desired to transfer material from a taller reservoir, a better design is served by using a 2-piece cylindrical configuration consisting of a single tubular apparatus having a more durable wearing surface which is connected to a less expensive transporting tube having the intention of providing conveyance of material from a larger material reservoir to a point of application being some distance from the material pumping source.

Eli Blitz and Mark Farnsworth U.S. Pat. No. 5,535,926 is a foot operated remote piston pump powered by an air supply which, on Sheet 2, FIG. 2 (of U.S. Pat. No. 5,535,926), according to the illustration, would not operate in a reliable manner. In claim one, it is noted, "1. An apparatus for applying mastic to a selected surface comprising: . . . pneumatic means for reciprocating the piston . . . " A major shortcoming is in the use of air to transfer liquids of heavier viscosities through a hose. Varying mixing techniques provided by different technicians can result in contrary viscosities of pumping material and causes a change in pumping speeds through the hose when the air pressure is set at a constant rate. On Sheet 3 FIG. 3 and in FIG. 4 (of U.S. Pat. No. 5,535,926) the diagrams show the internal components of their pumping system which is typical of the manual pump used in the art to fill automatic drywall tools and will only draw drywall material from the reservoir during the upstroke of their pump. While the air is pushing the pump piston downward drywall material from the reservoir is not being processed through the hose to the application tool. As a result, the technician must stop the application process until the pump reverses direction and drywall material flow begins again. Another disadvantage of the system is having the compressor switch 155 (FIG. 1 of U.S. Pat. No. 5,535,926) attached to the pumping unit near the floor. The location of the foot lever Sheet 1 FIG. 1 item 155 (of U.S. Pat. No. 5,535,926) restricts the technician's ability to work efficiently. As specified the total distance the application can be accomplished from the pump is limited by the distance extending from the further most point of the application tool to the further most point by which the technician is able to extend his foot and is able to activate the compressor switch 155 located near the base of their pump bearing hand truck (FIG. 1). This greatly reduces the ability to provide an effective application process.

Still another obvious problem with the design is the use of an on/off function being an electric switch which discontinues power to the air compressor. The invention has no definitive ability to stop the flow of compound in an immediate manner. During the blending process of drywall material, it is common for air bubbles to be introduced to the mixture as the rotating mixing paddle is moved through the drywall material in an upward and downward, and rotating motion to ensure a complete melding of the ingredients. Under pressure, while inside the hose the air bubbles diminish in size until they move toward the open end of the application tool. Because of the lack of any restriction at the end of the application tool, expansion of the bubbles within the drywall material occurs. The result of the expanding air bubbles in the drywall material without a means to limit the flow causes a continual expansion of drywall material leaking out the end of the applicator long after power to the compressor has been discontinued. Conversely when power is initiated to the compressor by way of the technician's foot interacting with the power switch 155 (FIG. 1 of U.S. Pat. No. 5,535,926) the drywall material in the hose, still containing air bubbles suspended in the mixture, causes a delay in the delivery of drywall material as the bubbles in the drywall material are constricted is in size before any drywall material is able to progress through the application tool.

In U.S. Pat. No. 5,497,812, the inventors Anthony R. Orosco and Alton P. Johnson provide a method for pumping drywall material from a reservoir using a pneumatic actuated cylinder to provide drywall material through a single acting pump typically used in the drywall industry. This system is best suited to refill applicators in the drywall industry known as automatic tools as they operate on a refilling basis. The invention (U.S. Pat. No. 5,497,812) is single-acting, only pulling drywall material from the smaller and industry standard 5-gallon reservoir on the up-cycle of operation thus making its design nonproductive when a continual dispensation of material is required (FIG. 1). Being driven by a pneumatic supply source, the system will experience fluctuations in the flow of material when encountering changes in viscid continuity. In addition, there is no method for controlling the flow of material from a remote source, eliminating the possibility of providing working material to an applicator operating at a remote location.

Ferdinand N. Guebeli and Norman A Cyphers design illustrated in U.S. Pat. No. 5,228,842 (FIG. 1) portrays an over center reservoir pump which is typical of the standard pumps used in the drywall and painting industries. Limited to a small reservoir in a characteristic volume of 5 gallons it is a design best suited to an application requiring a minimal discharge of material. It is not applicable to a system pushing large volumes of drywall material as it would become necessary to remove and replace the drywall material reservoirs in rapid succession and requiring the unnecessary labor of an additional operating technician.

In U.S. Pat. No. 4,962,819, Thomas F. Baily and Raymond A. Todd Jr. have illustrated on Sheet 1 FIG. 1 (of U.S. Pat. No. 4,962,819) an inner tubular body 20 which acts as a wearing surface to a wear resistant ring 38. Said tubular body 20 of (U.S. Pat. No. 4,962,819) is a single use item not able to be repurposed, and thusly unable to extend its original life span and deficient in its design allowing significant room for improvement.

In U.S. Pat. No. 4,541,779, on Sheet 1 FIG. 1 and Sheet 2 FIG. 3, J. C. Birdwell provides a design for a hydraulic powered double-acting piston pump. While it is beneficial to a variety of applications its fundamental design with springs and tight liquid passageways are not robust enough to deal with extremely thick or abrasive liquids. In the event that drywall material would ever dry inside the pump, it would create an extremely difficult platform by which to clean all areas without doing damage to its intricate components.

P. P. Hardcastle's patent, U.S. Pat. No. 3,015,529, provides an illustration of a single use external wear sleeve which is removeable and relatively easy to replace once it has worn beyond its ability to maintain a pressure seal. On Sheet 1 in FIG. 2 item 30 (of U.S. Pat. No. 3,015,529) designates the sleeve and its location within the larger housing body positioned in mounted proximity to the cycling arm of the pump. The length of the external wear sleeve item 30 (of U.S. Pat. No. 3,015,529) is in relational proportion to the length of the piston stroke of the pump and thus, unable to be reused once its ability to seal has been exhausted.

Thus, it would be desirable to provide a hydraulically supplied pumping apparatus that is specifically designed to transfer liquid-based abrasive materials from a material reservoir capable of remote operation which can be physically manipulated independent of a fixed structure that fulfills the following requirements and overcomes some or all of the aforementioned shortcomings.

SUMMARY OF THE INVENTION

The present invention is a remotely tethered hydraulically powered piston pump capable of physical manipulation between independent material reservoirs.

It is therefore an advantage of the present invention to provide a new method for implementing the installation of drywall taping, finishing and texturing materials in a more efficient manner which includes the ability to mix a portion of drywall compound once at the beginning of a drywall project, commence with the work for the day and at the end of the work day, remove the invention from a material reservoir, clean the invention and apply an amount of water over the material in the reservoir. Upon returning to the project the next day, the technician returns the invention to the material reservoir, connects the appropriate hoses and application tool(s) and commences with the application once again;

an object of the present invention is to provide a piston driven pump designed to transfer liquid-based abrasive materials by way of a pressurized hydraulic medium capable of physical manipulation between remote material reservoirs;

another object of the present invention is to provide a remotely tethered double acting pump having rigid independence from its fluidic supply source;

another object of the present invention is to provide a means of agripment whereby an operator may physically control the movement of an independent pump structure;

another object of the present invention is to provide a pump capable of being removed from one material reservoir and placed within another material reservoir by way of an operator's physical manipulation;

another object of the present invention is to provide a cylindrical pumping assembly comprising a less expensive transfer sleeve section and a more durable wearing sleeve section being located in immediate mechanical communication;

another object of the present invention is to offer a cylindrical sleeve assembly which comprises a wearing sleeve which can be removed and rotated 180 degrees and reinstalled to provide additional operational time for the wearing sleeve before an end-of-life replacement is required;

another object of the present invention is to provide a cylindrical sleeve assembly which provides a smooth cleaning surface;

another object of the present invention is to provide a supporting assembly which allows for the installation of a nonproprietary pump motor;

another object of the present invention is to provide a physical body located upon a pump motor connecting rod within a pump housing which encompasses an area of volume not less than 50 percent of the volume of material produced within the pump sleeve cylinder immediately internal of its first check valve and before the second check valve assembly at any point during the simultaneous upward progression of said physical body and the pump motor;

another object of the present invention is to provide a means to diminish the pulsation effect of a double acting piston pump comprising a compressible pressure sleeve capable of physical deformation located within a pump housing;

another object of the present invention is to provide a metering device capable of controlling the external flow of material to provide back pressure against an internal compressible pressure sleeve capable of physical deformation located within a pump housing;

another object of the present invention is to provide a double acting pump comprising an inherent means of delivering a flow of material through a variety of material exiting ports;

another object of the present invention is to provide a pumping apparatus that includes an inherent method for delivering pressurized air through a variety of channels capable of servicing a multiplicity of application tools;

Further objects and advantages of the present invention will become apparent from a consideration of the drawings and ensuing description.

The following brief and detailed descriptions of the drawings are provided to explain possible embodiments of the present invention but are not provided to limit the scope of the present invention as expressed herein this summary section.

BRIEF DESCRIPTION OF DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein:

FIG. 5 is a perspective view of a pump handle.

FIG. 6 is a cut away view from above exposing the general configuration of the pump handle.

FIG. 11 is a cut away lateral perspective of the lower cartridge housing one noting cut away references to FIG. 12 and to FIG. 13.

FIG. 12 provides an uppermost cut away view of various material exiting ports.

FIG. 13 provides an uppermost cut away view of the internal air manifold.

DETAILED DESCRIPTION OF THE INVENTION

The present specification discloses one or more embodiments that incorporate the features of the invention. The disclosed embodiment(s) merely exemplify the invention. The scope of the invention is not limited to the disclosed embodiment(s).

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment, Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
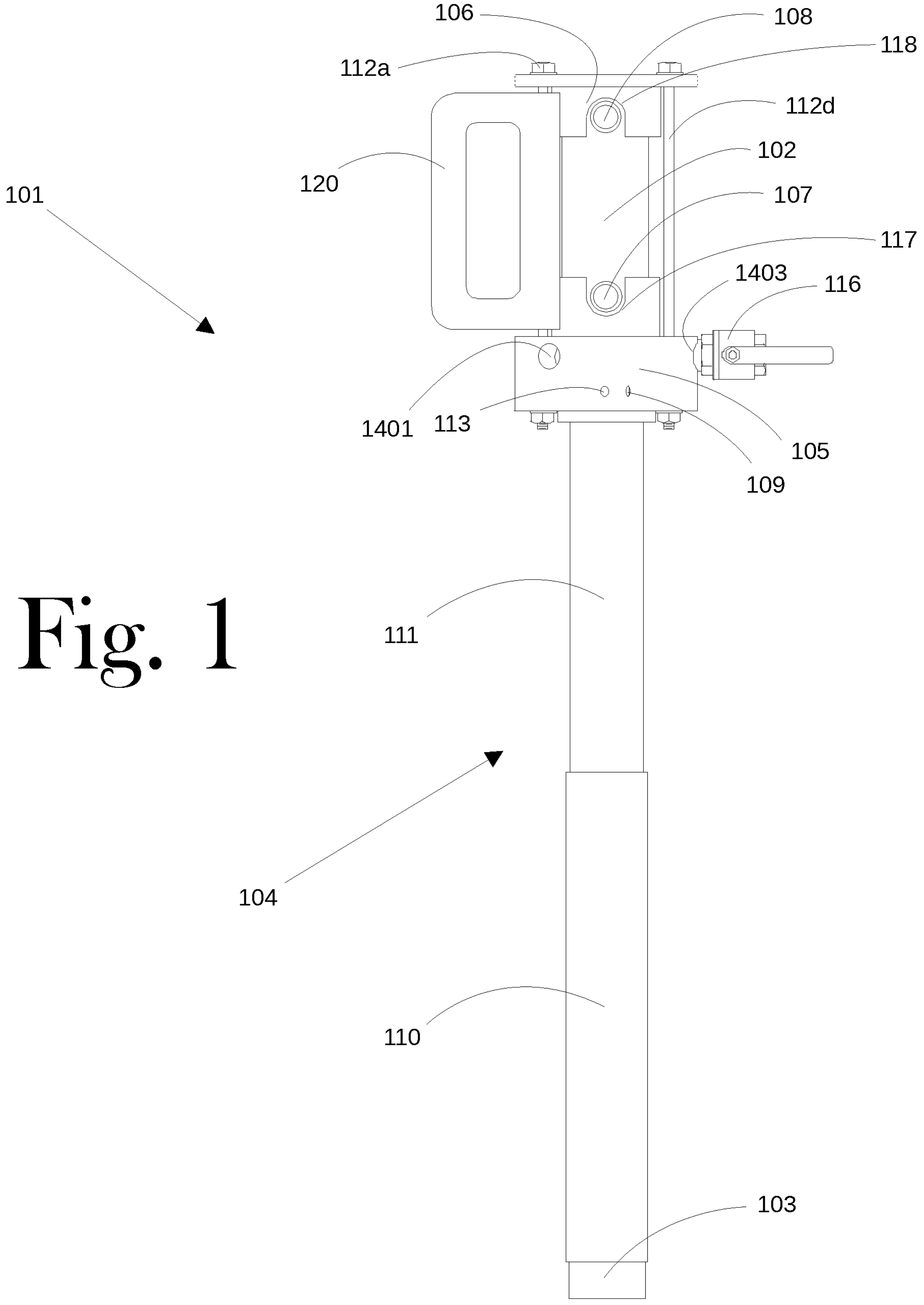
FIG. 1 shows an overall perspective view of the present invention.

The present invention exhibits a means for pumping high viscosity abrasive materials by way of a pressurized hydraulic medium capable of physical manipulation between remote material reservoirs. The following description is merely exemplary in nature and is in no way intended to limit the present invention, its application, or its uses. A vertically operated piston pump 101 (FIG. 1) comprises a cartridge housing two 106 (FIG. 1) which downwardly supports a pump motor 102 (FIG. 1) in a compressive manner holstering the pump motor 102 (FIG. 1) into a cartridge housing one 105 (FIG. 1) being rigidly affixed by various assembly fasteners of which assembly fastener one 112*a* (FIG. 1) and assembly fastener four 112*d* (FIG. 1) are indicated. Cartridge housing one 105 (FIG. 1) is secured to the cartridge housing two 106 (FIG. 1) through physical engagement with assembly fastener one 112*a* (FIG. 1), assembly fastener two 112*b* (FIG. 2) and assembly fastener three 112*c* (FIG. 2) and assembly fastener four 112*d* (FIG. 1). Piston pump motor 102 (FIG. 1) is affixed with pump motor port 107 (FIG. 1) and pump motor port 108 (FIG. 1). Pump motor port 107 (FIG. 1) and pump motor port 108 (FIG. 1) are secured within passageways provided in cartridge housing one 105 (FIG. 1) and cartridge housing two 106 (FIG. 1) being identified as port passageway one 117 (FIG. 1) and port passageway two 118 (FIG. 1) respectively.

Affixed using assembly fasteners identified as assembly fastener one 112*a* (FIG. 1) and assembly fastener two 112*b* (FIG. 2) is a pump handle 120 (FIG. 1). Inherent to cartridge housing one 105 (FIG. 1) are dual internal passageways; a material passageway is indicated by a material exiting port one 1401 as seen in FIG. 1. The second internal passageway is illustrated by an air manifold also identified in FIG. 1 as air manifold outlet one 113 also manifesting an air manifold inlet 109. Exiting proportional valve 116 is affixed at the material exiting port three 1403 (FIG. 1). An upper transfer tube 111 (FIG. 1) is securely fixed with the lower most section of cartridge housing one 105 (FIG. 1) whereby the opposite end of upper transfer tube 111 (FIG. 1) is affixed to a wearing sleeve 110 (FIG. 1). A first check valve 103 (FIG. 1) is mounted to the lower most end of said wearing sleeve 110 (FIG. 1).

Figure 2:
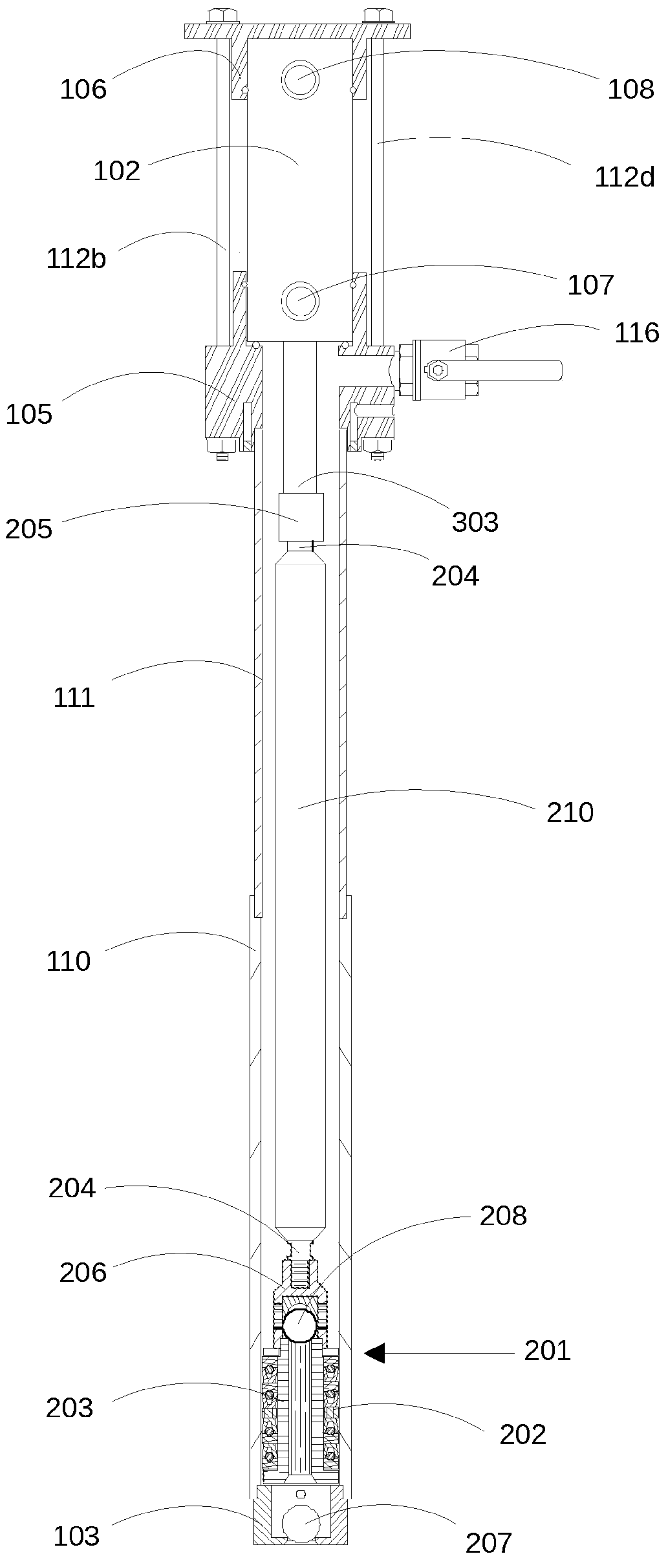
FIG. 2 sets forth a detailed perspective of the present invention disclosing the components relating to its improved design and function.

The pump handle 120 (FIG. 1) is positioned laterally within both pump motor housing sections of the pump assembly by internal securement through handle mounting aperture one 603 (FIG. 6) and mounting aperture 604 (FIG. 6) by way of the assembly fastener one 112*a* (FIG. 1) and assembly fastener two 112*b* (FIG. 2). FIG. 2 exhibits the mechanical relationship between the pump motor 102 (FIG. 2) and cartridge housing one 105 (FIG. 2) and cartridge housing two 106 (FIG. 2). The pump motor 102 (FIG. 2) has no external means of attachment from its housing body, being held in place by the compression resulting between cartridge housing one 105 (FIG. 2) and cartridge housing two 106 (FIG. 2) having a compressional relationship resulting from the force being applied by the tautening of assembly fastener one 112*a* (FIG. 1), assembly fastener two 112*b* (FIG. 2) assembly fastener three 112*c* (FIG. 2) and assembly fastener four 112*d* (FIG. 1). A pump motor extending shaft 303 (FIG. 3) and a connecting rod union 205 (FIG. 3) is mutually affixed between said pump motor extending shaft 303 (FIG. 3) and a pump motor connecting rod 204 (FIG. 3).

Figure 3:
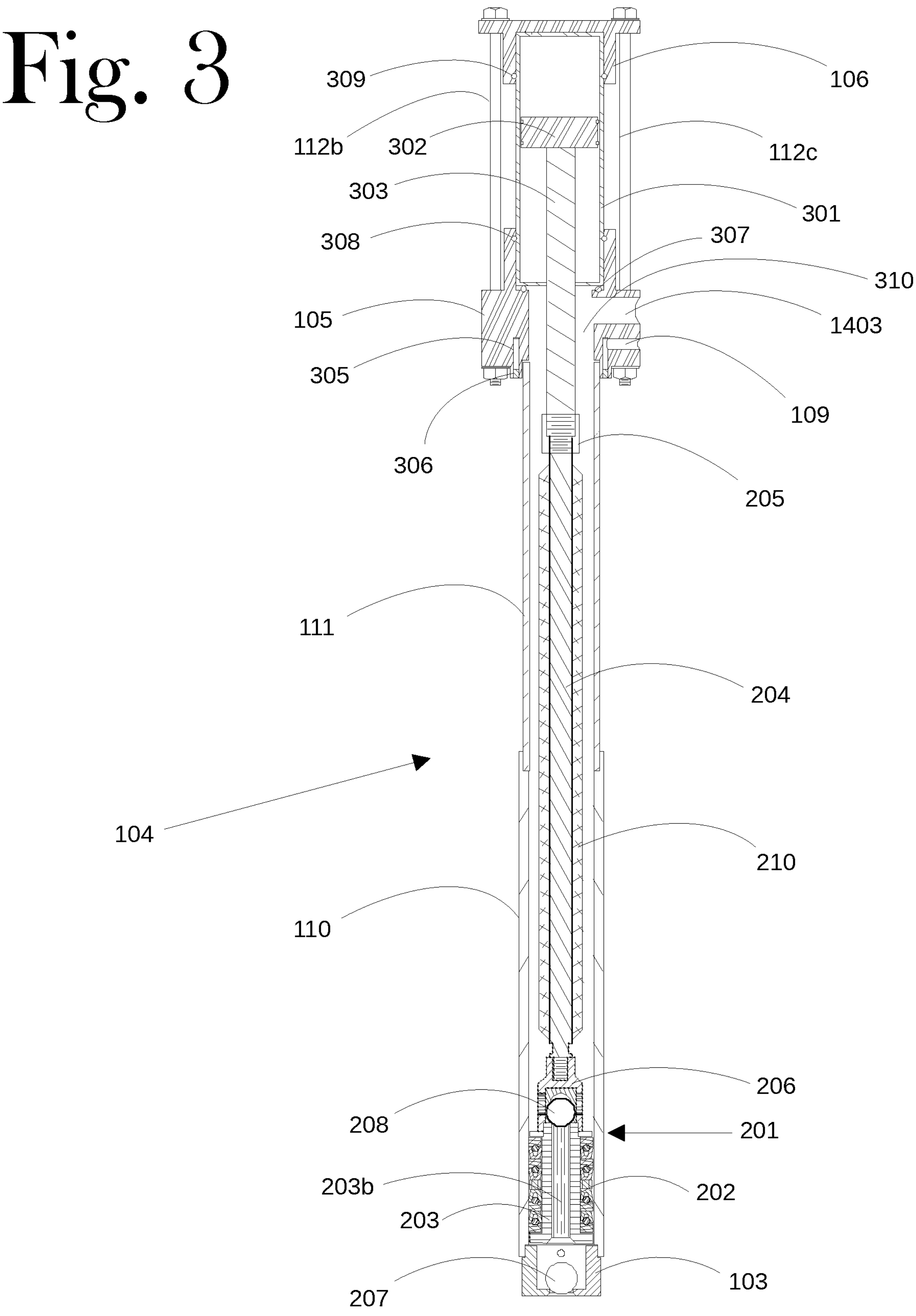
FIG. 3 highlights a cross sectional view of the present invention containing its pump motor and operational components.

Mounted in a circumferential relationship with the pump motor connecting rod 204 (FIG. 3) is a compressible pressure sleeve 210 (FIG. 3). Secured at the lower most end of the pump motor connecting rod 204 (FIG. 3) is a second check valve assembly 201 (FIG. 3) containing a piston check valve frame 206 (FIG. 3), a piston check valve ball 208 (FIG. 3), a second check valve seal assembly 203 (FIG. 3), a check valve material flow channel 203*b* (FIG. 3), a plurality of second check valve seals 202 (FIG. 3), the first check valve 103 (FIG. 3), and an internally located first check valve ball 207 (FIG. 3) within the wearing sleeve 110 (FIG. 3). The sectional view provided in FIG. 2 confirms the mounting relationship between the upper transfer tube 111, and the wearing sleeve 110 (FIG. 2), the affixed lower first check valve 103 (FIG. 2) with the wearing sleeve 110 (FIG. 2), and the upper collaborative union made between said upper transfer tube 111 (FIG. 2), and cartridge housing one 105 (FIG. 2).

The sectional perspective provided in FIG. 3 includes a visual representation of the components of the present invention better capable of providing the reader with additional understanding of the mechanical structuring of the device of the present invention, whereas pump motor housing 301 (FIG. 3) encases a pump motor extending shaft 303 (FIG. 3) which is affixed to a pump motor piston 302 (FIG. 3). Said pump motor housing 301 (FIG. 3) is secured downwardly by way of cartridge housing two 106 (FIG. 3) into cartridge housing one 105 (FIG. 3) being sealed on the vertical surface of cartridge housing one 105 (FIG. 3) by a second cartridge seal 308 (FIG. 3) and along its lower horizontal surface with a first cartridge seal 307 (FIG. 3). Enclosing the upper section of the pump motor housing 301 (FIG. 3) is the cartridge housing two 106 also illustrated in FIG. 3. The upper cartridge housing two 106 (FIG. 3) third cartridge seal cushion 309 (FIG. 3) is illustrated adjacent to the upper vertical surface of the pump motor housing 301 (FIG. 3). The upper cartridge housing two 106 (FIG. 3) is shown affixed to the lower cartridge housing one 105 (FIG. 3) by assembly fastener 112*b* (FIG. 3) and assembly 112*c* (FIG. 3) which are subcomponents of four assembly fasteners 112*a*, 112*b*, 112*c*, and 112*d* (assembly fasteners 112*a* and 112*d* are shown in FIG. 1). Also provided in FIG. 3, positioned immediately adjacent to atmosphere is an air manifold inlet 109 being provided within the body structure of the cartridge housing one 105 (FIG. 3) leading to a circular passage internally located within cartridge housing one 105 identified as internal air passage 305 (FIG. 3). An air passage sealing ring 306 (FIG. 3) is installed into the lower area of the internal air passage 305 (FIG. 3) having the lower edge of its cylindrical structure being aligned with the bottom edge of the internal air passage 305 (FIG. 3) cavity of the cartridge housing one 105 (FIG. 3) in a manner capable of eliminating air from escaping from within the internal air passage 305 (FIG. 3) after connecting an air supply coupler 119*a* (FIG. 13) to air manifold inlet 109, FIG. 3, and installing aftermarket female couplers (shown as external coupling options 119 in FIG. 13) to air manifold outlet one 113 (FIG. 13), air manifold outlet two 114 (FIG. 13), and air manifold three 115 (FIG. 13). Further to the details provided in FIG. 3, cycling through the material passageway chamber 310, affixed to the fastening end of the pump motor extending shaft 303 (FIG. 3) a connecting rod union 205 (FIG. 3) mates said pump motor extending shaft 303 (FIG. 3) to the upper end of a pump motor connecting rod 204 (FIG. 3). Positioned in a secure fashion, a compressible pressure sleeve 210 (FIG. 3) is mounted in a circumferential embodiment upon the pump motor connecting rod 204 (FIG. 3) under which a piston check valve frame 206 (FIG. 3) connects to the pump motor connecting rod 204 (FIG. 3) on its end opposite of its mating location with the aforementioned connecting rod union 205 (FIG. 3). Positioned within the piston check valve frame 206 (FIG. 3) a piston check ball valve 208 resides unattached to its surrounding components. A second check valve seal assembly 203 (FIG. 3) is mated below the piston check valve frame 206 (FIG. 3). 203*b* notates a check valve material flow channel which transverses the internal length of the second check valve seal assembly 203 (FIG. 3).

Figure 4:
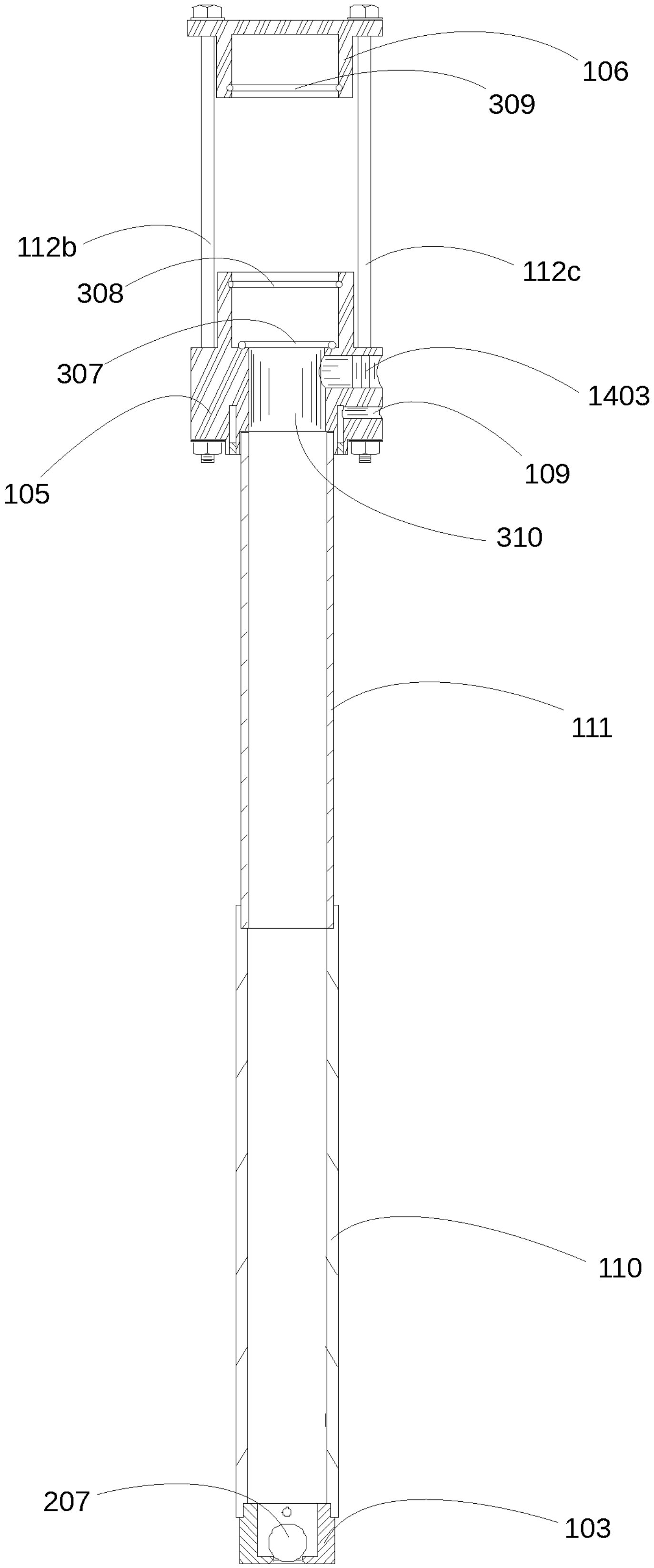
FIG. 4 illustrates an overall sectional view of the fixed housing structure containing the lower check valve of the present invention.
Figure 7:
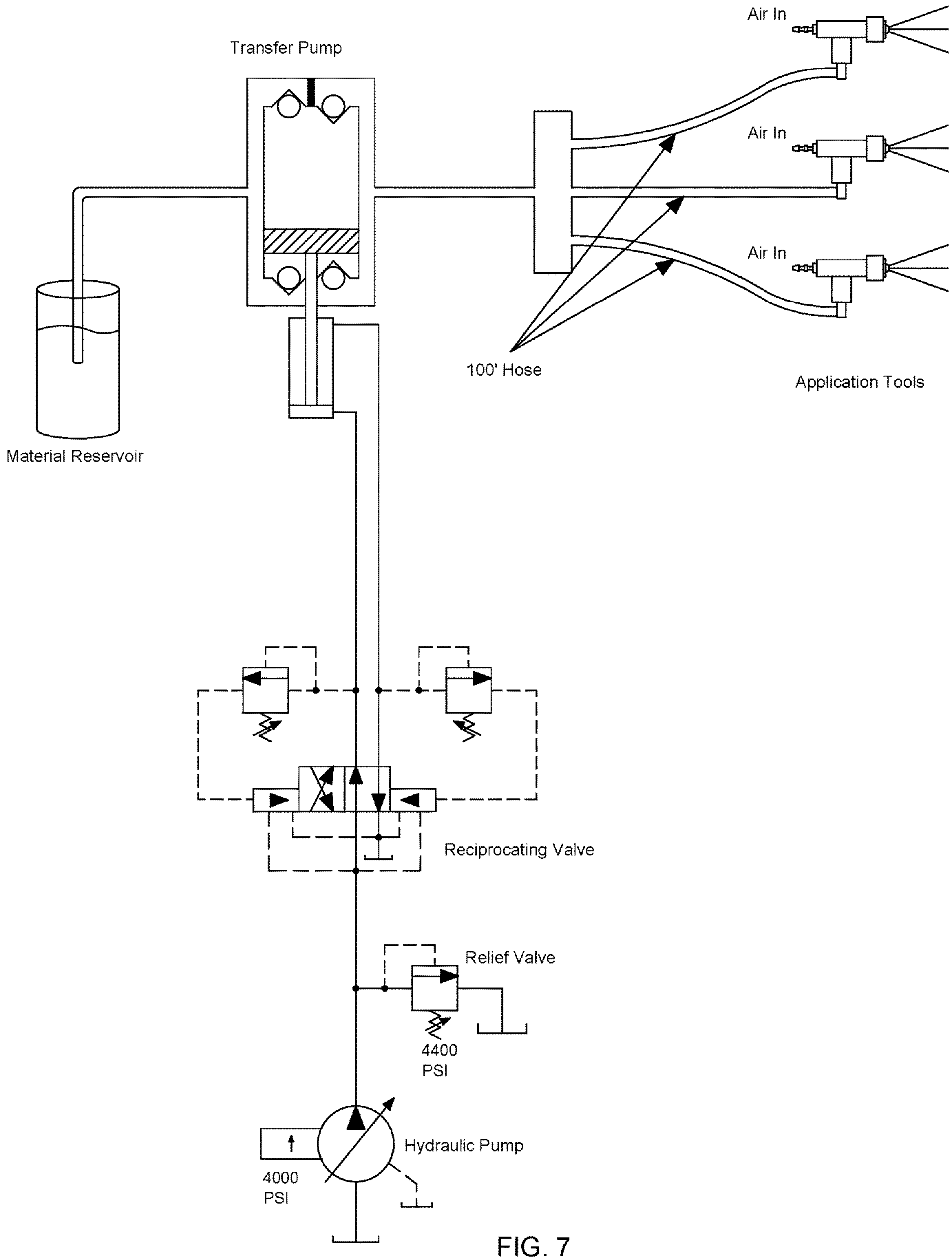
FIG. 7 depicts a diagram of the hydraulic power system disposed in communication with the system and method of the present invention.
Figure 8:
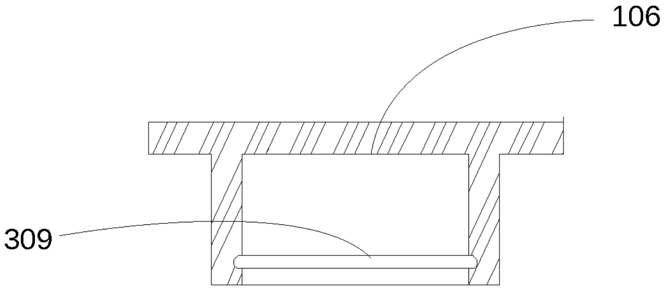
FIG. 8 provides a cross sectional view of upper cartridge housing two.
Figure 9:
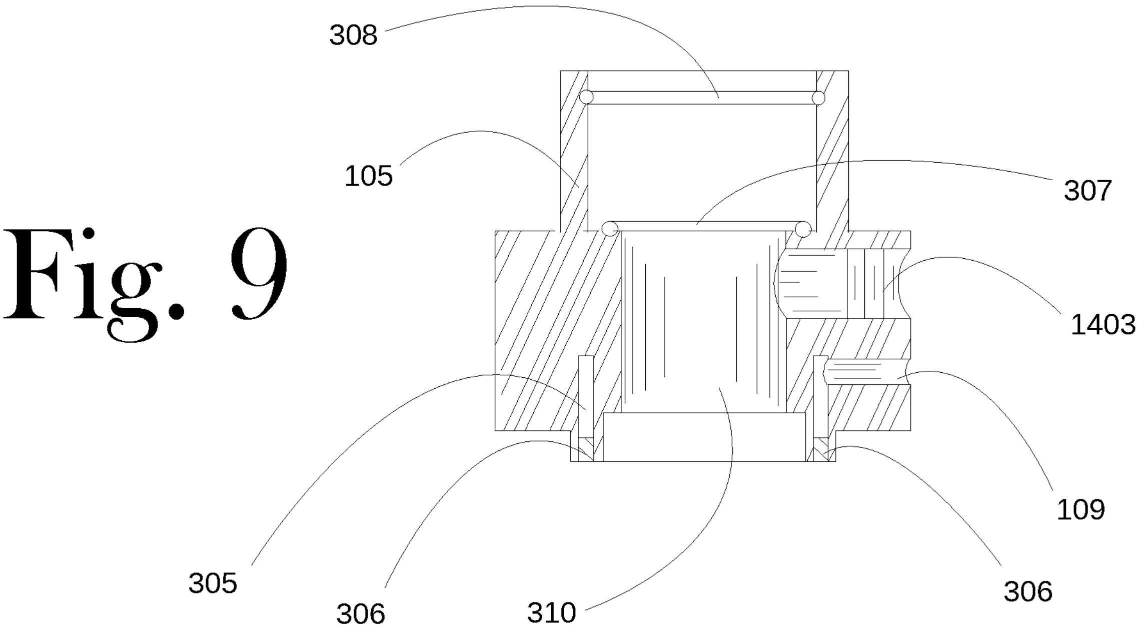
FIG. 9 provides a cross sectional view of first cartridge housing one.

For additional clarity, FIG. 4 illustrates an overall sectional view of the fixed housing structure of the present invention containing cartridge housing two 106 (FIG. 4), third cartridge seal cushion 309 (FIG. 4), assembly fastener two 112*b* (FIG. 4), assembly fastener three 112*c* (FIG. 4), the second cartridge seal 308 (FIG. 4), the first cartridge seal 307 (FIG. 4), the cartridge housing one 106 (FIG. 4), a material exiting port 1403 (FIG. 4), the air manifold inlet 109 (FIG. 4), the material passageway chamber 310 (FIG. 4), the upper transfer tube 111 (FIG. 4), the wearing sleeve 110 (FIG. 4), the first check valve 103 (FIG. 4) and the first check valve ball 207 (FIG. 4). FIG. 5 presents a sectional reference to FIG. 6 in regard to the pump handle 120 (FIG. 5) as attached within cartridge housing one 105 (shown in FIG. 1) and cartridge housing two 106 (shown in FIG. 1) by way of assembly fastener one 112*a* (shown in FIG. 5) and assembly fastener 112*b* (not shown in FIG. 5). Reference to a mounting aperture one 603 (FIG. 6) is provided by use of a hidden line in FIG. 5. FIG. 6 provides a section view of the pump handle 120 specifically itemizing the locations of the manual grip 601 (FIG. 6) in conjunction with the housing structure distanced from the cartridge housing one 105 (FIG. 6) with a grip passageway 602 (FIG. 6) being located between the manual grip 601 (FIG. 6) and the grip mounting structure 600 (FIG. 6). A handle mounting aperture one 603 (FIG. 6) and a handle mounting aperture two 604 (FIG. 6) are noted in a corresponding relationship with an assembly fastener passage one 1501 (shown in FIG. 13), and an assembly fastener passage two 1502 (shown in FIG. 13) each of which is structured within the cartridge housing one 105 (FIG. 6). Referring to the elaborated sectional drawing presented in FIG. 8, cartridge housing two 106 is shown in positional relationship to the third cartridge seal cushion 309. FIG. 9 is a more viewable cross section perspective of cartridge housing one 105 (FIG. 9) identifying the relevant locations of second cartridge seal 308 (FIG. 9) positioned in the vertical sleeve area of cartridge housing one 105 (FIG. 9) which is mountingly receptive to pump motor 102 (shown in FIG. 2). First cartridge seal 307 (FIG. 9) is positioned within the area of cartridge housing one 105 (FIG. 9) on its horizontal surface immediately adjacent to the material passageway chamber 310 (FIG. 9). The material exiting port 3 1403 (FIG. 9 and FIG. 12) is in perpendicular relationship to the material passageway chamber 310 (FIG. 9) which is comprised within the mechanical structure of cartridge housing one 105 (FIG. 9 and FIG. 13).

Figure 10A:
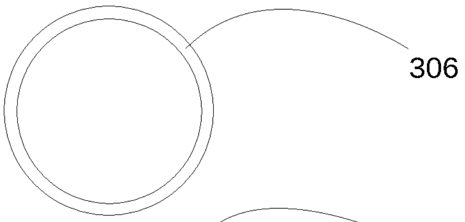
FIG. 10*a* illustrates a top view of the air passage sealing ring.
Figure 10B:
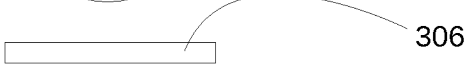
FIG. 10*b* illustrates a lateral view of the air passage sealing ring.

Identified as 109 (FIG. 9) is the air manifold inlet leading perpendicularly into the internal air passage 305 which is circumferentially located around the central diameter of cartridge housing one 105 (FIG. 9 and FIG. 13) employing an air passage sealing ring 306 (FIG. 9) attached within the lower area of the internal air passage 305. FIG. 10*a* provides a top perspective of the air passage sealing ring 306 with FIG. 10*b* permitting the viewer to view a horizontal perspective of air passage sealing ring 306. FIG. 13 provides a sectional perspective of cartridge housing one 105 containing sectional references to FIG. 13 and FIG. 11. FIG. 13 depicts the centrally located material passageway channel 310 within cartridge housing one 105 (FIG. 13) having a multiplicity of exiting ports notated as material exiting port one 1401 (FIG. 13), material exiting port two 1402 (FIG. 12), and exiting port three 1403 (FIG. 12). Assembly fastener passage one 1501 (FIG. 12) is depicted in approximate mechanical location as is assembly fastener passage two 1502 (FIG. 12), assembly fastener passage three 1503 (FIG. 12), and assembly fastener passage four 1504 (FIG. 12).

FIG. 13 is a section view of cartridge housing one 105 defining the approximate location of the air manifold inlet 109 (FIG. 13) supplying a passageway for air to feed into the internal air passage 305 (FIG. 13) having a plurality of air manifold outlets defined by air manifold outlet one 113 (FIG. 13), air manifold outlet two 114 (FIG. 13), and air manifold outlet three 115 (FIG. 13). For reference, though not components of the present invention, provided herein is an example of external coupling options 119 along with an air supply coupler option 119*a* to provide the reader with one possible configuration of the present invention.

Operation of the Present Invention

The application of a double acting piston pump providing the ability to transfer liquid abrasive materials by way of a pressurized hydraulic medium capable of physical relocation between remote material reservoirs by way of physical manipulation is a paradigm shift in the application of drywall to the interior wall and ceiling surfaces of a building structure and has no previous historical practice with which to reference. As such, the present invention offers a new method by which drywall installation is provided, having the main component of the method being the pump invention submitted herein.

Upon being awarded a contract for providing the drywall installation services on a building structure, the contractor orders the incidental products and a variety of boxed compound materials to be delivered from a material house to the job site. After the drywall panels have been installed, the technician known as the "finisher" begins his portion of the project which traditionally involves the installation of drywall tape and various layers of compound to provide a smooth surface for the next applicator, the texturing technician. The first day of the taping process, the finisher mixes enough drywall compound in one or more coordinated high-capacity reservoir(s) to supply the entire project. Project requirements may involve one or more reservoir(s) containing all-purpose compound and/or one or more reservoir(s), containing topping (or another) compound. There may be additional reservoirs required depending on the variety and types of compounds a specific project requires. Upon completion of the mixing process, the finisher removes the invention from a mobile hydraulic power system and takes the invention from the area of the hydraulic power system to the location where the drywall compound material has been prepared. The location of where the drywall compound has been prepared may be located within a few feet of the hydraulic power system or some distance away from the hydraulic power system which may be the case on a large-scale project such as a high-rise commercial building, a multi-building apartment complex or on a housing tract where multiple homes are being built in the same area. The finisher submerges the lower most end of the invention into the material reservoir and connects whatever application tool is required at the opposite end of the material supply hose which is coupled to the invention.

Such application tools are known in the art as Continuous Flow System tools and are available at drywall tool supply stores and online. At the end of the workday the finisher removes the hose from the invention and couples a sealing cap coupler to the end of the application hose(s) and also upon the material port(s) located on the invention. The finisher then applies a small amount of water to the surface of the material within the reservoir to prevent the surface edge of the material from drying, and then attaches a sealing cap to the reservoir. After removing the invention from the material reservoir, the technician cleans it with water and removes the invention from the job site along with the hydraulic power system until he returns the next day. Upon his return to the job site, the finisher simply removes the reservoir sealing cap from the reservoir and returns the invention to the material reservoir and continues the process of preparing the drywall surfaces. Once the finisher has completed his portion of the drywall process, the texture applicator may continue the texturing portion of the project using the same reservoir(s) of material that the finisher has already mixed. Depending on the size of the project and the number of installers being used, when setting up the invention for the work ahead, the installers may choose to connect multiple material hoses to the invention, which may or may not include air supply hoses, depending on the tasks at hand, and the application tools being used. Dependent on the progression of the project, the present invention is capable of supplying a combination of applications which may include multiple finishing application tools being operated simultaneously with a texture application tool, or multiple texture application tools being used in conjunction with a single finishing application tool all being supplied by a single or multiple material reservoirs.

Upon completion of the construction project, the operator cleans the reservoir he has used and removes it from the project, transporting it and the invention to the next project on his schedule. Typically, the present invention provides the drywall contractor with the ability to mix compound once at the beginning of the project, as opposed to the daily mixing in multiples of 5-gallon buckets as is currently the process used in the drywall industry. An operator may choose to maintain the location of the required hoses, a material reservoir, and the present invention along with the hydraulic power system upon a framed trailer unit or within an area of a moving vehicle to construct a self-contained mobile system. A mobile system provides the contractor with a pressurized supply of material along with a source of pressurized air allowing the operator to simply enter the construction project with the tool needed for the day and the length of hose required to function efficiently. Upon completing the required task, the operator simply returns the hose and application tool to the mobile system and proceeds to the next project. To diminish the effects of pulsation that the operator may encounter during the application process, the operator applies pressure upon the internal compressible pressure sleeve by closing the exiting proportional valve until the pulsation of liquid abrasive material has stopped.

ALTERNATE EMBODIMENTS OF THE PRESENT INVENTION

A self-cycling pump motor consisting of internal valving and individual securing bolts may be affixed directly to the lower cartridge housing one 105 (FIG. 2) by way of its individual securing bolts, negating the requirement for the upper cartridge housing two 106 (FIG. 2).

The means of connection between the pump motor and the piston rod may also consist of a quick release connection coupling.

The pump handle may be affixed to the invention utilizing assembly fasteners provided by a third-party pump motor manufacturer.

The pump handle may be alternatively affixed to the invention by way of a clamping mechanism. Any pressuring material capable of being forcibly reduced in size and physical volume may be used in place of polyurethane.

The compressible pressure sleeve component that is affixed to the piston rod may also be configured in any shape or pattern which is compatible with the interior pressurizing area of the present invention.

The compressible pressure sleeve component affixed to the piston rod may also be any mechanical device capable of an abbreviation in mass which can be positioned within the pressuring area of the present invention.

The compressible pressure sleeve may be comprised of a solid material to provide the pump with the ability to operate in a more conventional manner where the pulsation encountered with the flow of material induced by a double acting piston pump is not a hinderance to the application of a transferred material.

Though a ball valve is pictorially represented as a method of metering the expelled material in the drawings, any method of adjusting the external flow of liquid abrasive material exiting the pump is satisfactory.

Hardened 440 Stainless Steel may be replaced with another mineral based alloy or by a synthetic material capable of withstanding the required pressures and the abrasive nature of liquid to be applied.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A method for implementing the installation of drywall taping, finishing, and texturing materials via an abrasive materials pumping apparatus comprising:

- mixing drywall compound within a reservoir;
- submerging a lower-most end of the pumping apparatus into the reservoir;
- connecting an application tool to a first end of a material supply hose;
- connecting a second end of the material supply hose to the pumping apparatus;
- connecting the pumping apparatus to a remote hydraulic pump system;
- activating a pump motor of the pumping apparatus, causing pressure to build within at least one material passageway within the pumping apparatus;
- the remote hydraulic pump system supplying hydraulic fluid to the pumping apparatus through a reciprocating valve leading to the pump motor;
- wherein hydraulic fluid pressure is preset through a relief valve on the remote hydraulic pump system;
- abrasive material flowing through passageways within the pumping apparatus due to the application of built pressure;
- abrasive material moving out of the pumping apparatus through an exiting port into the material supply hose;
- air exiting out of the pumping apparatus through an air output port into an independent air hose;
- wherein said material supply hose and said independent air hose are terminated by an application tool;
- the independent air hose supplying pneumatic pressure to the application tool; and
- a valve metering the abrasive material as the abrasive material exits the pumping apparatus into the material supply hose via at least one exiting port.

2. The method of claim 1, wherein the application tool is a continuous flow system tool.

3. The method of claim 1, wherein the application tool is a texture application tool.

4. The method of claim 3, wherein the wearing sleeve is twice as long as a linear stroke length of the pump motor of the pumping apparatus.

5. The method of claim 4, further comprising:
removing a wearing sleeve upon an indication of wear;
rotating the wearing sleeve 180 degrees; and
reinstalling the wearing sleeve.

6. The process of claim 1, further comprising:
activating the application tool; and
the abrasive material evenly flowing out of the application tool via the compressed air activation of a material valve.

7. The process of claim 6, further comprising:
deactivating the application tool;
a relief valve closing within the pumping apparatus;
said reciprocating valve of the remote hydraulic pump system stalling,
preventing the pump motor from cycling; and
the abrasive material hose maintaining pressure.

8. The process of claim 7, further comprising:
activating the application tool;
a material valve of the application tool opening while simultaneously supplying a signal to a relief valve of the remote hydraulic pump system;
the relief valve opening;
said relief valve allowing hydraulic fluid to flow into a reciprocating valve of the pump motor, causing the pump motor to cycle.

* * * * *